United States Patent
Tamai et al.

[11] Patent Number: 6,140,741
[45] Date of Patent: Oct. 31, 2000

[54] VIBRATION TYPE ACTUATOR

[75] Inventors: Jun Tamai, Yokohama; Ichiro Okumura, Matsudo, both of Japan

[73] Assignee: Canon Kabushiki Kaisha, Tokyo, Japan

[21] Appl. No.: 09/119,726

[22] Filed: Jul. 21, 1998

[30] Foreign Application Priority Data

Jul. 28, 1997 [JP] Japan .................................. 9-201370

[51] Int. Cl.[7] .................................................. H01L 41/04
[52] U.S. Cl. .............................. 310/323.13; 310/323.01; 310/323.05; 310/323.06; 310/323.09
[58] Field of Search ................................ 310/81, 80, 82, 310/84, 311, 323, 325, 328, 331, 342, 345, 348, 321, 326, 327, 329, 330, 333, 351, 352, 353, 354, 323.01–323.17, 323.13

[56] References Cited

U.S. PATENT DOCUMENTS

| | | | |
|---|---|---|---|
| 4,626,732 | 12/1986 | Debaisieux et al. | 310/348 |
| 4,645,964 | 2/1987 | Hiramatsu et al. | 310/323 |
| 4,678,956 | 7/1987 | Izukawa | 310/323 |
| 4,937,488 | 6/1990 | Fujie et al. | 310/323 |
| 5,006,750 | 4/1991 | Besson et al. | 310/348 |
| 5,115,161 | 5/1992 | Myohga et al. | 310/323 |
| 5,122,700 | 6/1992 | Tamai et al. | 310/323 |
| 5,124,611 | 6/1992 | Tamai et al. | 310/317 |
| 5,155,401 | 10/1992 | Kanaya et al. | 310/89 |
| 5,231,325 | 7/1993 | Tamai et al. | 310/323 |
| 5,506,462 | 4/1996 | Tamai et al. | 310/328 |
| 5,548,175 | 8/1996 | Tamai | 310/323 |
| 5,574,326 | 11/1996 | Chiba et al. | 310/323 |
| 5,585,685 | 12/1996 | Maeno et al. | 310/323 |
| 5,594,291 | 1/1997 | Tamai et al. | 310/323 |
| 5,600,196 | 2/1997 | Tamai | 310/323 |
| 5,684,353 | 11/1997 | Fujimoto | 310/323 |
| 5,760,529 | 6/1998 | Tamai et al. | 310/323 |
| 5,814,919 | 9/1998 | Okumura | 310/323 |

FOREIGN PATENT DOCUMENTS 1-252178  10/1989  Japan .
3-011981  1/1991  Japan .

*Primary Examiner*—Nestor Ramirez
*Assistant Examiner*—Dang Dinh Le
*Attorney, Agent, or Firm*—Fitzpatrick, Cella, Harper & Scinto

[57] ABSTRACT

A vibration type actuator comprises an electro-mechanical energy conversion element, a plurality of elastic members sandwiching the conversion element therebetween, a fastening member for fastening the plurality of elastic members, a movable member contacting with at least one of the plurality of elastic members and rotated by vibration created in the elastic members, an output shaft rotated by the rotation of the movable member, and a case covering the elastic members and the movable member. The fastening member is formed with a through-hole through which the output shaft extends, and the output shaft extends through the through-hole and is rotatably supported at the positions of the axial end portions of the case.

33 Claims, 5 Drawing Sheets

VIBRATION TYPE ACTUATOR

BACKGROUND OF THE INVENTION

1. Field of the Invention

This invention relates to a vibration type actuator such as a vibration type motor having an output shaft.

2. Related Background Art

A bar-like vibration wave motor as a vibration actuator has as basic construction a vibration member having a piezoelectric element as an electro-mechanical energy conversion element sandwiched between elastic members, and a rotatable member pressure-contacting the driving surface of the vibration member, for example, the end surface of this vibration member. This type having an output shaft is disclosed in Japanese Laid-Open Patent Application No. 1-252178. The bar-like vibration wave motor of this type having an output shaft, as shown in FIG. 5 of the accompanying drawings, has a bar-like vibration member 180 disposed in an outer case 190, and has one end portion of the vibration member 180 supported on a bottom lid 135. Two bearings 140 are provided on one end portion of the outer case 190, and an output shaft 113' fixed to the rotatable member 113 is supported by the bearings 140. Balls 110, 112 and 115 supported by retainers 109, 111 and 114, respectively, are successively stacked on the other end side of the vibration member 180, and the rotatable member 113 is brought into pressure contact with the balls 115 by a spring 138, one end of which is supported by a thrust bearing 139 mounted in the case 190. When a driving signal is applied to the piezoelectric element of the vibration member 180, the vibration member rotates the above-mentioned balls and the rotatable member 113 is rotated and the output shaft 113' is also rotated.

In the above-described example of the prior art, however, the output shaft is disposed only on one side of the vibration member and, therefore, the distance between the two bearings supporting the output shaft is short. On the other hand, a rotational force transmitting member such as a gear or a pulley is usually mounted on the output shaft. When an external load is applied to the rotational force transmitting member, a side force is applied to the output shaft, and the output shaft becomes inclined. As a result, the frictional sliding surface is subjected to an offset load and, thus, a uniform frictional driving force is not created, and a reduction in service life is caused by a reduction in motor efficiency, the creation of noise and the offset wear of the frictional material.

SUMMARY OF THE INVENTION

A vibration type actuator as one aspect of the invention has a fastening member for fastening two elastic members together with an electro-mechanical energy conversion element sandwiched between the two elastic members, the fastening member being formed with a through-hole through which an output shaft extends, a rotatable member contacting at least one of the two elastic members being fixed to the output shaft, the output shaft being adapted to protrude to the axially opposite sides of the two elastic members, and being supported by a case.

DESCRIPTION OF THE PREFERRED EMBODIMENTS (First Embodiment)

Figure 1:
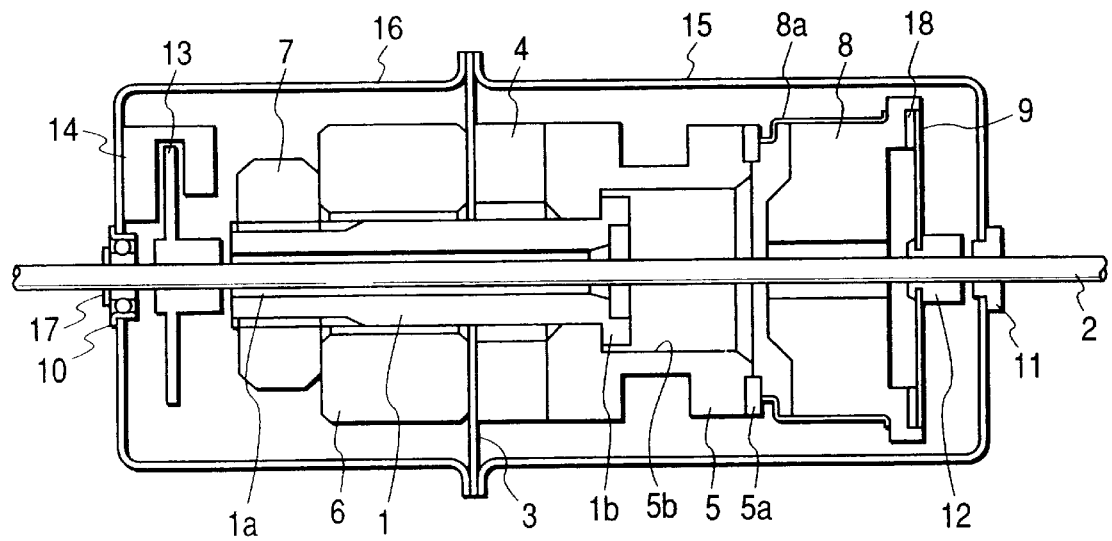
FIG. 1 is a cross-sectional view showing an embodiment of the present invention.

FIG. 1 shows a first embodiment of the present invention.

Figure 2:
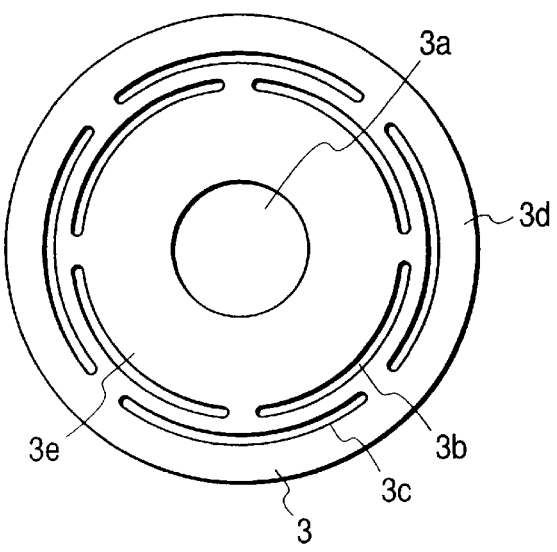
FIG. 2 is a plan view of the support member of FIG. 1.

In FIG. 1, a circular ring-shaped piezoelectric element 4 as an electro-mechanical energy conversion element and a support member 3 shown in detail in FIG. 2 are sandwiched between bar-like hollow metallic members 5 and 6 as two elastic members, and are fixed by a hollow bolt as a fastening member 1 and a nut 7 to thereby constitute a vibration member.

The vibration member of the present embodiment is of a type in which two flexural vibrations created by the piezoelectric element 4 are combined together to thereby create oscillating movement in the hollow metallic member 5, and the driving principle thereof is well known as described in Japanese Laid-Open Patent Application No. 3-611981 (U.S. Pat. No. 5,548,175) and therefore need not be described. However, this vibration member is not limited to combining two flexural vibrations together, but may combine, for example, torsion and vertical vibration together. A fastening member such as a bolt extends through the axis portion of the vibration member, and if the piezoelectric element is fixed by this bolt or the like, an effect similar to that of the present embodiment can be displayed.

The vibration member of the present embodiment is constructed of the support member 3 sandwiched with the piezoelectric element 4. The support member 3 is formed into a disc-like shape as shown in FIG. 2, and the outer peripheral portion thereof is joined to the abutting surface of outer cases 15 and 16.

The roles of the support member 3 are to fix the vibration member and to prevent the vibration created by the vibration member from being transmitted to the cases 15 and 16. Therefore, the support member 3 has a suitable thickness. If the support member 3 is too thin, it will be unable to fully perform the function of fixing, whereby the vibration member cannot determine its spatial position, and the frictional contact between a frictional member 8a on a movable member 8 side and a frictional member 5a on the vibration member side will become unstable and the friction transmitting efficiency to the movable member 8 will be reduced to thereby cause the creation of noise and a reduction in motor efficiency.

On the other hand, if the support member 3 is too thick, the vibration of the vibration member will be suppressed and the vibration member will become low in the efficiency of converting from electrical energy to mechanical energy. Further, the vibration of the vibration member will be transmitted to the cases 15 and 16. When vibration is created in the cases 15 and 16, the influence thereof will be imparted to an apparatus or the like on which the vibration type actuator is mounted. For the reasons set forth above, the support member 3 needs to be designed to for effect for the aforedescribed roles.

In the present embodiment, the support member 3, as shown in FIG. 2, is formed with a central hole 3a in the central portion thereof and, further, arcuate slots 3b and 3c are formed concentrically with a phase difference of 45°. A portion 3d provided radially outside the outermost slots 3c is the joint portion between the case 15 and 16, and a portion 3e provided between the central hole 3a and the slots 3b is sandwiched between the elastic member 6 and the piezoelectric element 4.

By mean of slots 3b and 3c, the support member is made highly rigid in a direction in which firm fixing is necessary, and is made resilient in a direction in which the vibration member vibrates. Also, the support member is sufficiently rigid with respect to any torsional reaction force due to rotation of the movable member. Further, a phenomenon (surging) in which the support member 3 creates resonance relative to the vibration of the vibration member also is avoided. The optimum shape of the hole is varied in accordance with a position at which the vibration member is supported. For example, when the support member 3 is provided near the position of the antinode of vibration of the vibration member, the support member 3 needs to be resilient relative to a radial direction.

On the other hand, when the support member 3 is provided near the node of vibration of the vibration member, the support member 3 needs to be resilient relative to the direction of thickness thereof. After the support member 3 is designed with the above-described consideration given, the purpose of preventing the vibration of the vibration member from being transmitted to the cases may be achieved more completely.

For this purpose, although not shown, it is effective to insert a material of high vibration attenuating capability between the support member 3 and the cases 15 and 16. The material of high vibration attenuating capability typically is rubber, felt, resin or the like.

Further, the support member 3 itself may be made of the material of high vibration attenuating capability. Also, the joint of the support member 3 to the cases is effected by electric resistance welding, but the joint may be done by laser welding, electron beam welding, brazing or an adhesive agent.

Next, a bolt 1 for holding is formed with a through-hole 1a at the center thereof for passing therethrough an output shaft 2 made of martensitic stainless steel. In the present embodiment, the head 1b of the bolt 1 for holding is provided with clearance fit for the hole portion 5b of a metallic member 5 as an elastic member, but alternatively may be forced in. Also, in order to prevent the bolt 1 from rotating relative to the metallic member 5, one or both of the bolt and the inner diameter of the metallic member may be provided with a detent such as spline or double chamber. In the present embodiment, an axial force is imparted to the head 1b of the bolt 1 to thereby create a frictional force between the head 1b of the bolt 1 and the metallic member 5 so that the bolt 1 may not rotate when a nut 7 is fastened thereto. A frictional sliding member 5a is joined to the end portion of the metallic member 5.

A movable member 8 is mounted on the output shaft 2 extending through the through-hole 1a of the bolt 1 on the case 15 side, and a rotatable member 13 used as an encoder is mounted on the case 16 side. Butyl rubber 18 is adhesively secured between the movable member 8 and a belleville spring 9. The belleville spring 9 has its central portion fixed by caulking to a caulking member 12 made of brass and forced onto the output shaft 2, and has the role of bringing the frictional sliding member 8a of the movable member 8 into pressure contact with the frictional sliding member 5a of the metallic member 5.

When an alternating signal is applied as a driving signal from a driving circuit, not shown, to the piezoelectric element 4, two flexural vibrations of different phases are excited and a driving wave as a travelling wave formed by the combination thereof is created in the metallic member 5 as the elastic member, and the vibration displacement thereof is transmitted to the frictional sliding member 8a having a springy property on the movable member 8 side through the frictional sliding member 5a, and the movable member 8 effects rotational movement to thereby rotate the output shaft 2. At that time, the output shaft 2 is rotated without creating any backlash, when the frictional sliding member 8a on the movable member 8 side is rotated, because the butyl rubber 18 is adhesively secured between the belleville spring 9 and the movable member 8. The frictional sliding member 8a on the movable member side is made by press working a thin plate of stainless steel.

On the other hand, a snap ring 17 is fitted on a constricted portion provided on the output shaft 2 opposite to the movable member 8. By making the space between the snap ring 17 and the caulking member 12 into a predetermined distance, constant displacement is caused in the belleville spring 9 so that the frictional sliding member 8a may pressure-contact the frictional member 5a on the vibration member side with a predetermined pressure force.

A bearing 11 coaxially fixed to the outer case 15 is a sintered member of stainless steel impregnated with lubricating oil and decreases frictional resistance. Even brase is congenial to a stainless steel shaft. Use may also be made of resin such as polyacetal. A bearing 10 is likewise fixed to the outer case 16. The reaction force of the aforementioned pressure force is applied in the axial direction of the bearing 10 and therefore, a ball bearing is used as means for decreasing frictional resistance. Of course, a thrust bearing may also be used.

Near the bearing 10, a rotatable plate 13 which is an encoder part for detecting the rotated position is fixed to the output shaft 2. A number of holes are radially formed in the rotatable plate 13, and by the interception and passage of light projected from a photointerrupter 14 fixed to the case 16, the number of the holes in the rotatable plate 13 is counted to thereby detect the rotated state thereof. If the photointerrupter 14 is of a fiber type which can obtain thin rays of light, it will be more desirable because the resolving power thereof is improved and the positioning accuracy thereof is enhanced.

Description will now be made of a method of manufacturing the bolt 1 adopted in the present embodiment. If the bolt 1 is to be made by cutting, a through-hole may be formed in the axis of a round bar by a drill or a pipe material may be cut. However, the manufacturing method adopted in the present embodiment is a combination of heading (a kind of forging) and form rolling.

According to this method, even a material of high toughness difficult to cut, for example, nickel-chromium-molybdenum steel or the like is workable. Moreover, without fiber structure extending axially being cut by drawing and by combining plastic working and heat treatment together, grains become fine and therefore, a tough bolt can be made. The hollow bolt in the present embodiment is manufactured by this plastic working.

This method is shown in FIGS. 3A to 3F. A pipe material P and a round bar D entering into the hole portion P1 thereof with a gap are prepared as blanks. One or both of the round bar D and the pipe material P have their surfaces subjected to zinc-phosphate lubricated coating treatment (trade mark: Bonderized).

Figure 3A:
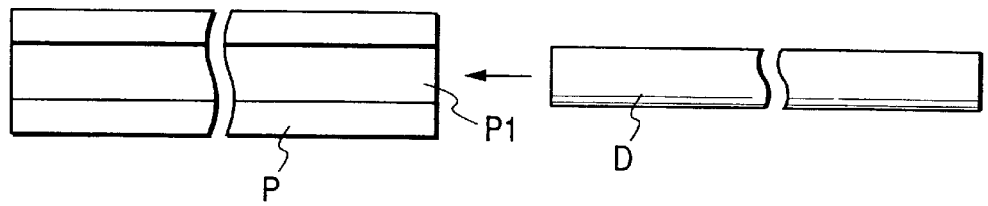
FIGS. 3A, 3B, 3C, 3D, 3E and 3F show the process of manufacturing the hollow bolt of FIG. 1.
Figure 3B:
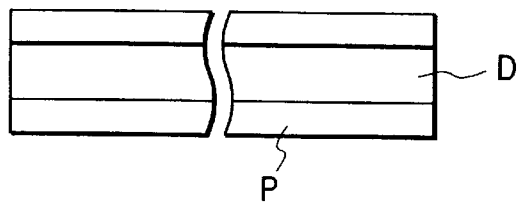
Figure 3C:
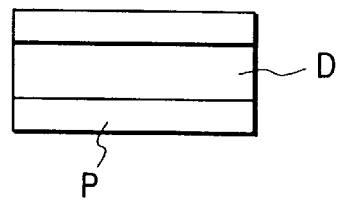
Figure 3D:
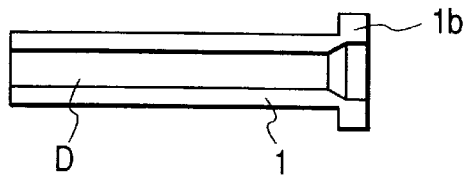
Figure 3E:
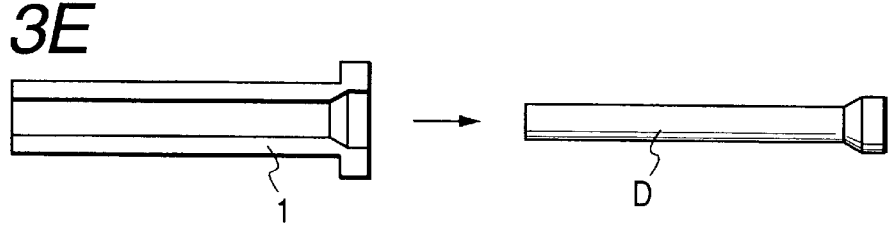
Figure 3F:
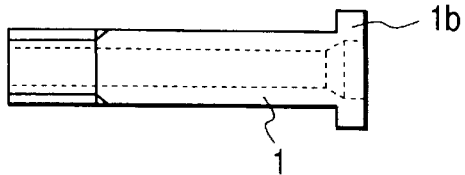

Thereafter, as shown in FIGS. 3A and 3B, the round bar D is inserted into the hole portion P1 of the pipe material P. Next, as shown in FIG. 3C, the pipe material P with the round bar D inserted therein is cut to a predetermined length, whereafter as shown in FIG. 3D, it is headed by the use of a metal mold to thereby form a bolt head 1b. Thereafter, this formed article is heated, whereupon the lubricating component of the aforementioned zinc-phosphate lubricated coating treatment is melted, whereby, as shown in FIG. 3E, the deformed round bar blank D can be simply taken out of the formed article, and as shown in FIG. 3F, a thread is finally formed by form rolling, whereby the shape of the bolt is formed. Rust prevention has been effected by nickel plating, but may be done by black dyeing.

In the present embodiment, a solid bolt as a fastening member for fixing elastic members sandwiching therebetween a piezoelectric element in the vibration member of a bar-like vibration wavemotor according to the prior art is simply replaced with a hollow bolt, whereby the output shaft can be made to extend through the vibration member.

Moreover, proof twisting stress is necessary in a bolt as a fastening member, but the member near the center hardly contributes to a reduction in such stress, and there is little or no disadvantage in that the bolt in the present embodiment is a hollow bolt.

This also holds true of bending stress, and since the design of the vibration member is hardly affected, a vibration member designed by the use of a solid bolt can be intactly replaced with a hollow bolt.

(Second Embodiment)

Figure 4:
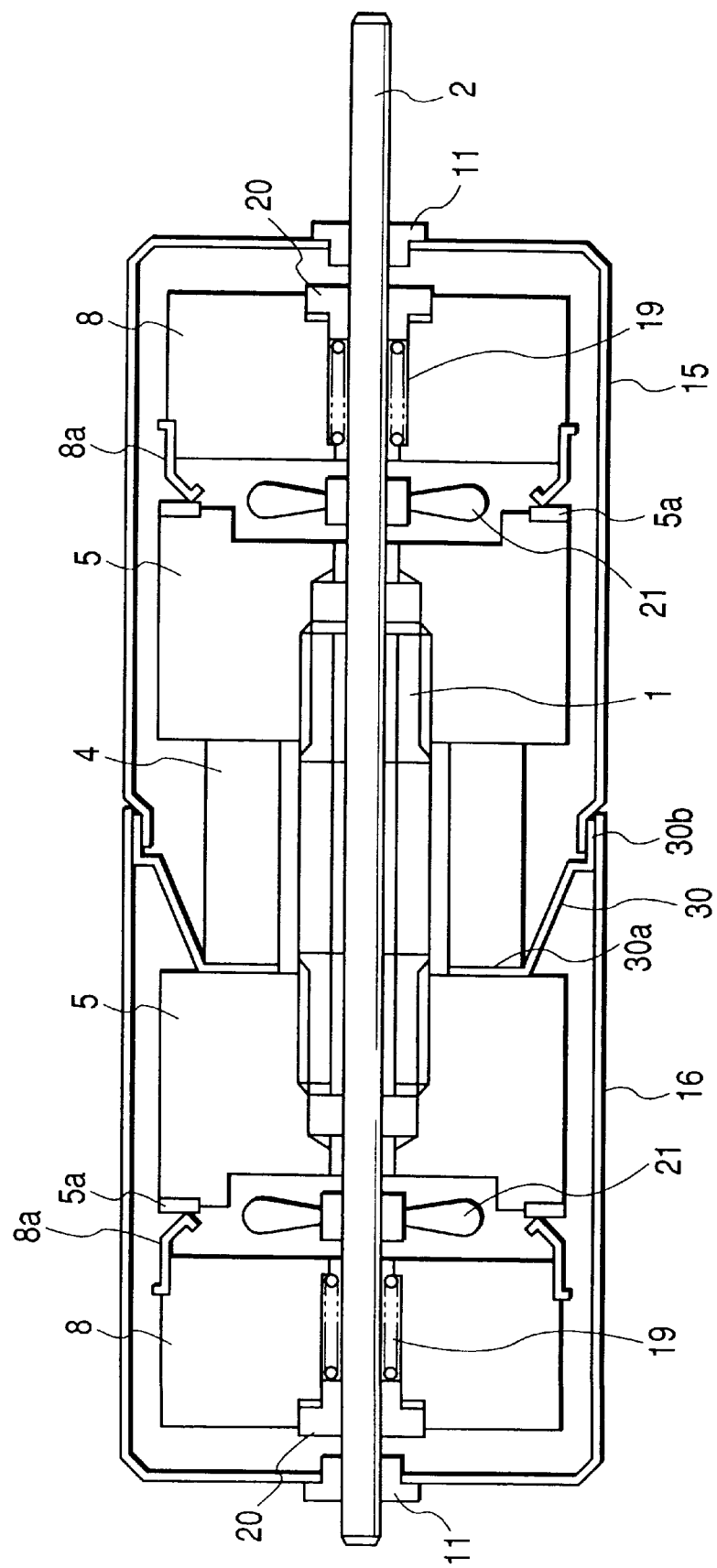
FIG. 4 is a cross-sectional view showing a second embodiment of the present invention.
Figure 5:
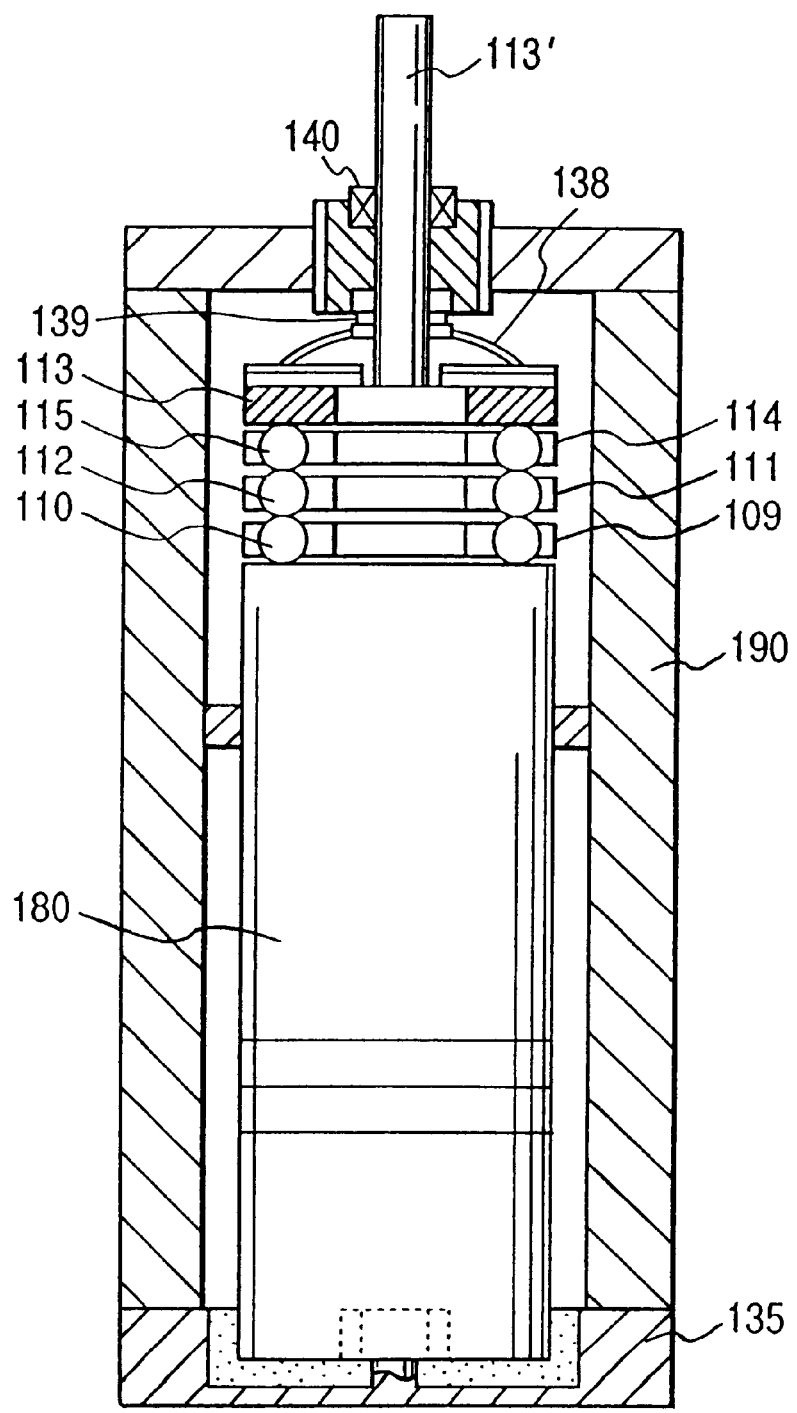
FIG. 5 is a cross-sectional view showing a vibration type actuator according to the prior art.

FIG. 4 shows a second embodiment of the present invention.

A vibration member in this embodiment is of a construction in which a piezoelectric element 4 is sandwiched between two metallic members 5, which are hollow elastic members formed with internal threads of the same shape on the inner peripheral portions thereof, by a hollow bolt 1 as a fastening member, provided by cutting a stainless steel pipe and forming threaded portions on the outer periphery of the opposite end portions, threadably engaged with the internally threaded portions of the two metallic members 5 to thereby fix the piezoelectric element.

The outer diameter of the piezoelectric element 4 in the present embodiment is made smaller than the outer diameter of the two metallic members 5, and the small-diametered flange portion 30a of a support member 30 formed into a truncated conical shape is sandwiched between the piezoelectric element 4 and one of the metallic members 5 as elastic members. As described above, the sandwiched and fixed portion of the small-diametered flange portion 30a of the support member 30 is small in diameter and therefore, it is difficult to restrain the vibration of the vibration member. However, that portion of the support member 30 which is not sandwiched and fixed can be secured widely in a limited space, and this leads to the effect that the degree of freedom of the design of the support member 30 increases. That is, the support of the support member 30 on the vibration member side (the inner diameter side) is at a location smaller in diameter than the outer diameter of the elastic members (metallic members 5) and, therefore, the effective length of the support member can be made great and the effect as described above can be provided.

On the other hand, the cylinder portion 30b of the support member 30 on the large-diameter side thereof is sandwiched and fixed between the joined portions of the fitted type of outer cases 15 and 16.

The outer case 15 is subjected to press drawing, and thereafter is subjected to the working of puckering up its mouth as used in a method of making a drink can. An adhesive agent is applied to the cylinder portion 30b on the large-diameter side which is a portion in which the support member 30 is sandwiched between the outer cases, so that the cases may not be detached.

Bearings 11 made of oil-containing resin for supporting an output shaft 2 extending through the hollow bolt 1 are forced into the central portions of the bottom plate portions of the outer cases 15 and 16. The bearings 11 are of such structure that no axial force is applied thereto contrary to the case of the first embodiment, and therefore, need not be high-class bearings such as ball bearings.

In the present embodiment, movable members 8 are disposed on opposite sides of the vibration member, and are brought into pressure contact with the respective elastic members 5 by pressing coil springs 19 provided for the respective movable members 8.

The coil spring 19 mounted in the central hole portion of each movable member 8 has its one end side position regulated by a detent member 20 forced onto the output shaft 2 and imparts a pressure force to the movable member 8. Also, the detent member 20 is provided with a detent such as double chamfer or spline on the outer peripheral portion thereof and therefore, the movable members 8 and the output shaft are axially movable relative to each other, but are adapted to be moved as a unit in the same direction.

Also, two fans 21 are forced onto the output shaft 2 and are adapted to rotate with the rotation of the output shaft 2. The fans 21 are provided between the movable members 8 and the metallic members 5 as the elastic members, whereby abrasion powder created on the frictional sliding surface is made to adhere to the inner walls of the outer cases by winds created by the fans 21. The abrasion powder is thus eliminated and is caused to adhere to a functionally uninfluenced portion thereby to maintain a stable frictional force and suppress the promotion of the abrasion by the abrasion powder acting as a grinding material and prevent the abrasion powder from accumulating in the movable portions of the bearings and the narrow gap between the detent member and the movable member to hamper the bearing and pressing functions.

Also, the fans 21 are adapted to send the winds in the axial direction as well by the rotation of the output shaft 2 to thereby cool the vibration member. At this time, the directions of the two fans 21 are the same directions and therefore, the flow of the air is in a predetermined direction through a through-hole to thereby enhance the cooling effect. This also leads to an effect obtained because a hole extends through the bolt.

Further, in the present embodiment, two movable members 8 are coaxially mounted on an output shaft 2 and thus, double torque is easily obtained as compared with a case where only one movable member 8 is provided. This construction is very effective as a vibration wave motor in which high torque is the greatest feature.

In the vibration wave motor according to the prior art, there was provided a movable member for a vibration member, while in the present embodiment, two movable members 8 are provided on the opposite sides of the vibration member and these two movable members are coupled to the same output shaft, whereby, as compared with a motor having a single movable member, there are the following effects:

(1) The starting torque becomes about double. The aforementioned pressure contacting force is limited by abrasion or the like, but when this pressure contacting force is made equal, double torque is created in the output shaft.

(2) The irregularity of rotation becomes small. The irregularity of rotation is usually caused by the unstable contact state of the aforementioned pressure contact portion. The unstable contact state in turn is caused by the planarity of the frictional surface and the fact that the vibration of the vibration member is not circular about the axis thereof. These factors of working accuracy are the main causes and they make a limitation. However, when two movable members are provided, the aforementioned unstable contact states are offset and therefore the irregularity of rotation becomes small.

(3) The internal loss of the vibration member decreases and the efficiency of the motor is improved. When a single movable member is provided, the end portion of the vibration member in which the movable member is not provided vibrates freely, and energy is consumed by the attenuation of the vibration thereof. A motor having two movable members generates an output twice as great as that of a motor having a single movable member, for example in a case where the torque is double and the number of revolutions is the same. In that case, the internal loss of the vibration member becomes equal. Consequently, the efficiency of the whole is improved.

Frictional sliding members 5a are joined to the elastic members 5, and frictional members 8a are provided on the movable members 8 in a fitted manner, and the members 5a and 8a are adapted to contact with each other. Also, the frictional member 8a in the present embodiment, unlike the case of the first embodiment, does not use the thick plate portion of the plate material which is a blank as the frictional sliding surface thereof; the plate surface portion thereof is bent so that the frictional sliding area can be secured widely, and the convex portion of the bent portion is lapped and thereafter is made into a frictional sliding surface.

If the frictional sliding portion 8a on the movable member 8 side is formed by this method, it becomes possible to make the force with which the frictional member 8a of the movable member 8 is brought into pressure contact with the frictional sliding member 5a on the vibration member side great and in addition, the corners of the frictional sliding surface do not become sharp and do not plane the partner frictional sliding member 5a on the vibration member side and quicken the progress of the abrasion thereof. Of course, the above-described construction of the frictional sliding member will hold true even if the vibration member side and the movable member side are replaced with each other.

(Third Embodiment)

Figure 6:
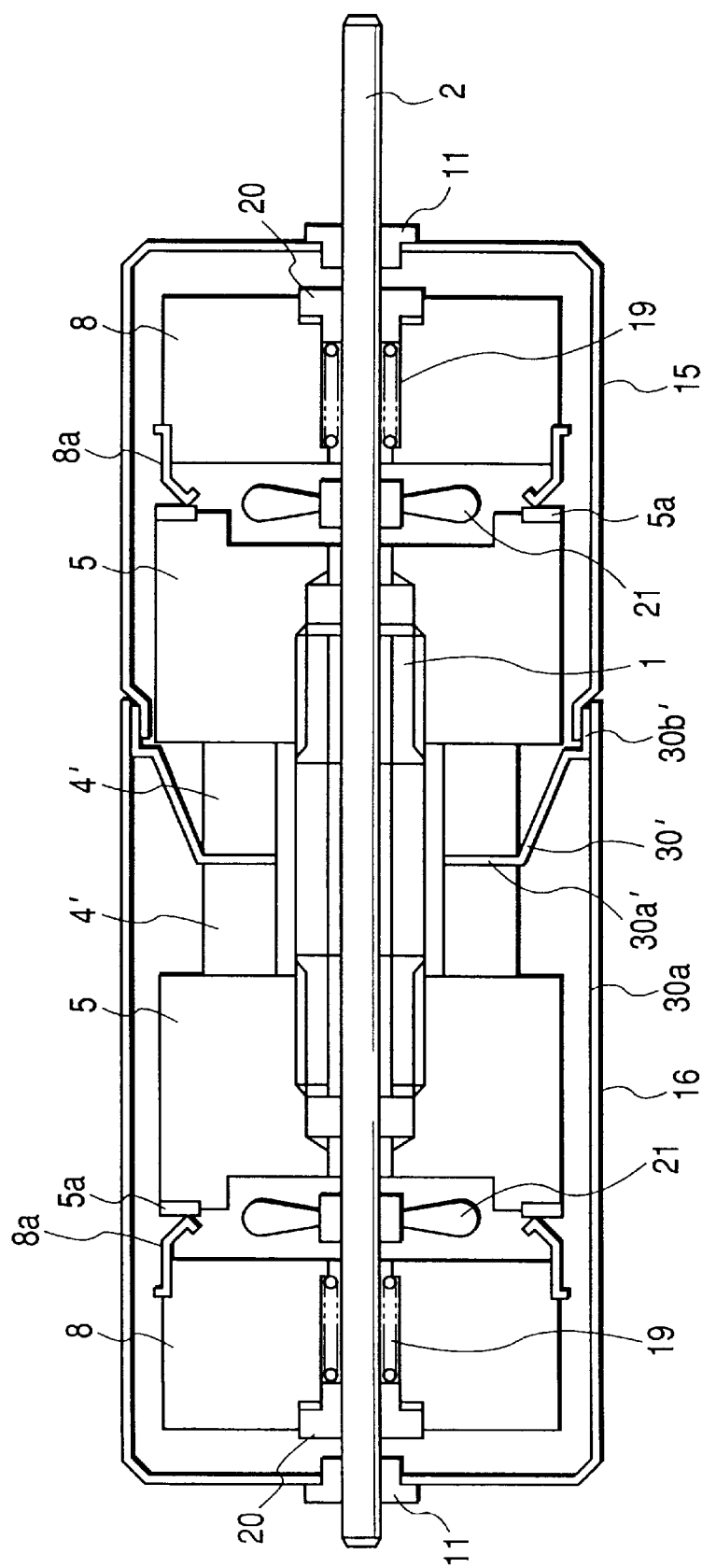
FIG. 6 is a cross-sectional view showing a third embodiment of the present invention.

Description will now be made of a third embodiment of the present invention shown in FIG. 6. The third embodiment is such that the supported position of the support member 30 on the vibration member side in the second embodiment has been changed. Specifically, the support member 30' in the third embodiment is sandwiched between two piezoelectric elements 4' divided. In other points, the construction of the third embodiment is the same as that of the second embodiment shown in FIG. 4 and therefore need not be described in detail.

The reference character 30a' designates the small-diametered flange portion of the support member 30', and the reference character 30b' denotes a cylinder portion on the large-diameter side.

According to the embodiments of the present invention, in a vibration actuator of a type in which an electro-mechanical energy conversion element such as a piezoelectric element is sandwiched and fixed between elastic members, a through-hole is formed in a fastening member, for example, a bolt, and an output shaft is extended through the through-hole, whereby the output shaft can be supported at two spaced-apart locations. Moreover, the bolt as a fastening member can be simply replaced with a hollow one without changing the design of the existing vibration member. Therefore, the output shaft does not change its posture by an extraneous force and make the contact state of the frictional sliding portions of a movable member and a vibration member unstable.

Consequently, increased stability of the output of the actuator, a reduction in the amount of abrasion of the frictional sliding member and a reduction in the creation of noise can be achieved.

Also, the output is supported at opposite ends of the case, and therefore, it becomes difficult for the output shaft to be inclined. Thus, the frictional sliding surfaces of the elastic member and the movable member do not receive a great offset load and a uniform frictional driving force can be obtained. Accordingly, there can be achieved an improvement in motor efficiency, lower noise and uniform abrasion.

Also, a support member for supporting the vibration member is sandwiched and fixed between portions smaller in diameter than the outer diameter of the vibration member. Therefore, it is possible to provide a design which will hardly hamper the vibration of the vibration member.

Also, the movable members are provided on opposite end portions of the vibration member, whereby there can be realized a motor of high torque. Also, stable, smooth rotation is obtained.

Further, fans for creating wind force are provided between the movable member and the vibration member, whereby an increase in the action of eliminating abrasion powder and a cooling effect are obtained and therefore, the stability of the performance of the actuator and an improvement in the durability thereof can be achieved, and the use of the actuator at higher temperatures is made possible, and an improvement in efficiency can also be achieved.

What is claimed is:

1. A vibration actuator comprising:
   an electro-mechanical energy conversion element;
   a plurality of elastic members sandwiching said conversion element therebetween;
   a shaft-shaped fastening member for fastening said plurality of elastic members, said fastening member having a through-hole extending therethrough;
   a movable member contacting at least one of said plurality of elastic members and rotatably driven by vibration created in said at least one elastic member;
   an output shaft extending through the through-hole of said shaft-shaped fastening member and rotatable by rotation of said movable member; and
   a case having axial end portions and covering said plurality of elastic members and said movable member, said output shaft being rotatably supported by the axial end portions of said case.

2. A vibration actuator according to claim 1, wherein said electro-mechanical energy conversion element creates different flexural vibrations in a plurality of directions, and causes portions of said elastic members contacting said movable member to affect circular or elliptical movement.

3. A vibration actuator according to claim 1, further comprising a support member, wherein said plurality of elastic members and said electro-mechanical energy conversion element are supported relative to said case by said support member.

4. A vibration actuator according to claim 3, wherein said support member is sandwiched between one of said plurality of elastic members and said electro-mechanical energy conversion element.

5. A vibration actuator according to claim 4, wherein said case includes a plurality of case portions, and said support member is supported at a coupled position of said plurality of case portions.

6. A vibration actuator according to claim 4, wherein two movable members respectively are provided in contact with said plurality of elastic members at axially opposite sides of said plurality of elastic members, and each of said two movable members is fixed to said output shaft.

7. A vibration actuator according to claim 3, wherein said electro-mechanical energy conversion element is divided into a plurality of conversion elements, and said support member is sandwiched between said plurality of conversion elements.

8. A vibration actuator according to claim 7, wherein said case includes a plurality of case portions, and said support member is supported at a coupled position of said plurality of case portions.

9. A vibration actuator according to claim 7, wherein two movable members respectively are provided in contact with said plurality of elastic members at axially opposite sides of said plurality of elastic members, and each of said two movable members is fixed to said output shaft.

10. A vibration actuator according to claim 3, wherein said case includes a plurality of case portions, and said support member is supported at a coupled position of said plurality of case portions.

11. A vibration actuator according to claim 3, wherein an intermediate portion of said support member defines a hole formed in said support member.

12. A vibration actuator according to claim 3, wherein two movable members respectively are provided in contact with said plurality of elastic members at axially opposite sides of said plurality of elastic members, and each of said two movable members is fixed to said output shaft.

13. A vibration actuator according to claim 1, wherein two movable members respectively are provided in contact with said plurality of elastic members at axially opposite sides of said plurality of elastic members, and each of said two movable members is fixed to said output shaft.

14. A vibration actuator according to claim 13, wherein each of the axial end portions of said case comprises a bearing, and said output shaft is rotatably supported by said bearings.

15. A vibration actuator according to claim 13, further comprising a fan fixed to said output shaft.

16. A vibration actuator according to claim 13, further comprising a rotatable encoder member fixed to said output shaft.

17. A vibration actuator according to claim 1, wherein each of the axial end portions of said case comprises a bearing, and said output shaft is rotatably supported by said bearings.

18. A vibration actuator according to claim 1, further comprising a fan fixed to said output shaft.

19. A vibration actuator according to claim 1, further comprising a rotatable encoder member fixed to said output shaft.

20. A vibration actuator comprising:

an electro-mechanical energy conversion element;

a plurality of elastic members having a maximum outer diameter and sandwiching said conversion element therebetween;

a shaft-shaped fastening member for fastening said plurality of elastic members, said shaft-shaped fastening member having a through-hole extending therethrough;

a movable member contacting at least one of said plurality of elastic members and rotatably driven by vibration created in said at least one elastic member;

an output shaft extending through the through-hole of said shaft-shaped fastening member and rotatably driven by rotation of said movable member;

a case covering said plurality of elastic members and said movable member and rotatably supporting said output shaft;

a support member fixed to said case and supporting said plurality of elastic members and said electro-mechanical energy conversion element, where said support member supports said plurality of elastic members and said electro-mechanical energy conversion element relative to said case at a position smaller in diameter than the maximum outer diameter of said plurality of elastic members.

21. A vibration actuator according to claim 20, wherein said electro-mechanical energy conversion element creates different flexural vibrations in a plurality of directions, and causes portions of said elastic members contacting said movable member to affect circular or elliptical movement.

22. A vibration actuator according to claim 20, wherein said support member is sandwiched between one of said plurality of elastic members and said electro-mechanical energy conversion element.

23. A vibration actuator according to claim 22, wherein said case includes a plurality of case portions, and said support member is supported at a coupled position of said plurality of case portions.

24. A vibration actuator according to claim 20, wherein said electro-mechanical energy conversion element is divided into a plurality of conversion elements, and said support member is sandwiched between said plurality of conversion elements.

25. A vibration actuator according to claim 24, wherein said case includes a plurality of case portions, and said support member is supported at a coupled position of said plurality of case portions.

26. A vibration actuator according to claim 24, wherein two movable members respectively are provided in contact with said plurality of elastic members at axially opposite sides of said plurality of elastic members, and each of said two movable members is fixed to said output shaft.

27. A vibration actuator according to claim 20, wherein said case includes a plurality of case portions, and said support member is supported at a coupled position of said plurality of case portions.

28. A vibration actuator according to claim 27, wherein two movable members respectively are provided in contact with said plurality of elastic members at axially opposite sides of said plurality of elastic members, and each of said two movable members is fixed to said output shaft.

29. A vibration actuator according to claim 20, wherein an intermediate portion of said support member defines a hole formed in said support member.

30. A vibration actuator according to claim 20, wherein two movable members respectively are provided in contact with said plurality of elastic members at axially opposite sides of said plurality of elastic members, and each of said two movable members is fixed to said output shaft.

31. A vibration actuator according to claim 20, wherein said case comprises a plurality of bearings, and said output shaft is rotatably supported by said plurality of bearings.

32. A vibration actuator according to claim 20, further comprising a fan fixed to said output shaft.

33. A vibration actuator according to claim 20, further comprising a rotatable encoder member fixed to said output shaft.

* * * * *

UNITED STATES PATENT AND TRADEMARK OFFICE
CERTIFICATE OF CORRECTION

PATENT NO.   : 6,140,741
DATED        : October 31, 2000
INVENTOR(S)  : JUN TAMAI, ET AL.

It is certified that error appears in the above-identified patent and that said Letters Patent is hereby corrected as shown below:

COLUMN 2

Line 53, "suppressed" should read --suppressed,--.
    Line 61, "for effect for" should read --effect--.

Signed and Sealed this

Twenty-ninth Day of May, 2001

Attest:

NICHOLAS P. GODICI

Attesting Officer      Acting Director of the United States Patent and Trademark Office